(12) United States Patent
Yu et al.

(10) Patent No.: US 9,245,427 B2
(45) Date of Patent: Jan. 26, 2016

(54) SYSTEM AND METHOD FOR SYNCHRONIZATION OF NETWORKED FIRE ALARM PANELS

(75) Inventors: Jaime Yu, Brossard, CA (US); Michael W. Greene, East Templeton, MA (US); Erick Drummond, Shrewsbury, MA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 1101 days.

(21) Appl. No.: 13/271,976

(22) Filed: Oct. 12, 2011

(65) Prior Publication Data
US 2013/0094622 A1   Apr. 18, 2013

(51) Int. Cl.
| | |
|---|---|
| G08B 5/38 | (2006.01) |
| G08B 25/04 | (2006.01) |
| H04L 12/42 | (2006.01) |
| H04J 3/06 | (2006.01) |
| G08B 25/00 | (2006.01) |
| G08B 26/00 | (2006.01) |
| G08B 29/12 | (2006.01) |

(52) U.S. Cl.
CPC ...... *G08B 5/38* (2013.01); *G08B 25/04* (2013.01); *H04J 3/0667* (2013.01); *H04L 12/422* (2013.01); *G08B 25/007* (2013.01); *G08B 26/005* (2013.01); *G08B 29/123* (2013.01)

(58) Field of Classification Search
CPC ........ H04L 7/0012; H04L 7/0008; H04L 7/00
USPC ........................................................ 375/354
See application file for complete search history.

(56) References Cited

U.S. PATENT DOCUMENTS

| | | | |
|---|---|---|---|
| 6,906,616 B1 | 6/2005 | Curran et al. | |
| 7,280,550 B1 * | 10/2007 | Rosenboom | 370/404 |
| 7,826,374 B2 * | 11/2010 | Frei | 370/238 |

(Continued)

FOREIGN PATENT DOCUMENTS

EP   1808836 A2   7/2007

OTHER PUBLICATIONS

International Search Report dated Jan. 31, 2013 for PCT/US2012 filed Oct. 5, 2012.

*Primary Examiner* — Noel Beharry
*Assistant Examiner* — Nicole E King
(74) *Attorney, Agent, or Firm* — Kacvinsky Daisak Bluni PLLC

(57) ABSTRACT

A system and method for synchronizing a plurality of networked fire alarm panels is disclosed. A plurality of fire panels (i.e., nodes) are arranged on a peer-to-peer network, such as a token ring network. One node is designated as a SyncHost, and the remaining nodes are periodically reset to the clock time associated with the SyncHost to ensure all nodes remain substantially synchronized to a single time. As such, when an alarm condition is signaled, the visual notification devices (i.e., strobe lights) of all the fire panels (nodes) will flash at substantially the same time, in accordance with government guidelines. To accomplish the synchronization, the SyncHost sends periodic attendance polls around the network, noting the transit times of the polls. The individual nodes on the network also note times associated with the polls. The SyncHost sends a sync message to the nodes, and each of the individual nodes resets its internal clock according to the sync message and internal compensations calculated that are based on the attendance poll transit times. Other embodiments are disclosed and claimed.

16 Claims, 11 Drawing Sheets

(56) References Cited

U.S. PATENT DOCUMENTS

| | | | |
|---|---|---|---|
| 8,412,919 B2* | 4/2013 | Luo | 713/1 |
| 2003/0234725 A1* | 12/2003 | Lemelson et al. | 340/521 |
| 2006/0104198 A1* | 5/2006 | Takano | 370/210 |
| 2010/0085885 A1* | 4/2010 | Sakurada et al. | 370/252 |
| 2010/0118721 A1 | 5/2010 | Sakurada et al. | |
| 2013/0215821 A1* | 8/2013 | Yamamoto et al. | 370/315 |

* cited by examiner

SYSTEM AND METHOD FOR SYNCHRONIZATION OF NETWORKED FIRE ALARM PANELS

FIELD OF THE DISCLOSURE

The invention relates generally to systems and methods for synchronizing networked fire alarm system components, and more particularly to a system and method for synchronizing fire alarm notification appliances distributed in a token ring network.

BACKGROUND OF THE DISCLOSURE

Typical building fire alarm systems include a number of detectors positioned throughout a building. Signals from those detectors are monitored by a fire panel which, upon sensing an alarm condition, activates a number of notification appliances throughout the building. The notification appliances can include audible alarms, such as sounders or horns, and visual alarms, which can include flashing light strobes. Typically, the fire panel drives these devices over one or more "notification appliance circuits" (NACs).

In very large buildings, a plurality of individual fire panels may be used to service the building. For example, each floor of such a building may be serviced by its own fire panel, with all of the fire panels connected to a network. In addition, for commercial and/or educational campuses, certain portions of the campus may be served by different fire panels. For example, a courtyard or atrium that adjoins several buildings or building floors may be serviced by a plurality of notification appliances (i.e., strobes) controlled by different fire panels.

Such installations may require that the output of all notification devices be synchronized. For example, where multiple strobes are used, the strobe flashes must be synchronized to reduce the risk of seizure for people having photosensitive epilepsy. Underwriters Laboratories (UL) can require such strobes to be controlled to ensure that an individual viewing multiple strobes will see effective flash rates no higher than a predetermined amount to reduce the aforementioned risk. As can be appreciated, this presents a problem where the multiple flashing strobes are controlled by different fire panels. To date, the only solutions to this problem have been hardware based. For example, to synchronize the strobes within a large area, all of the strobes would need to be run from a single fire panel, which undesirably requires wiring all of the affected areas back to the single fire panel rather than wiring the strobes to the closest for panel. As can be appreciated, hardware synchronization increases system costs in terms of additional time.

Thus, there is a need for an improved system and method for synchronizing the flashes of a plurality of strobe lights controlled by a plurality of different fire panels. The system and method should be appropriate for use across a variety of modern distributed network systems used to link multiple fire panels.

SUMMARY

A system and method are disclosed for enabling a plurality of fire alarm system devices, such as strobe lights, to be synchronized across multiple nodes (i.e., fire panels) of a distributed fire alarm network, without the need for additional hardware.

Timing and traffic on a network can be unpredictable and variable. Where notification appliances are implemented in a token ring network, the topology of the network can change as a result of an event, such as a break in one of the network lines or a reboot of one of the nodes (i.e., fire panels). Such changes can affect network performance, and thus they require a constant calculation of network performance statistics in order to ensure that system devices remain synchronized.

A method for synchronizing nodes on a network is disclosed, comprising: sending, from a first node, a plurality of attendance polls on a communication link; receiving, at a second node, the plurality of attendance polls; sending, from the second node, the plurality of attendance polls to the first node on the communication link; and sending, from the first node, a sync message to the second node, the sync message including data to enable the second node to reset a clock to the same time as a clock of the first node, wherein the data is based on timing information obtained using the plurality of attendance polls.

A system is disclosed for synchronizing nodes on a network. The system includes a first node for sending a plurality of attendance polls on a communication link, and a second node for receiving the plurality of attendance polls and for sending the plurality of attendance polls to the first node on the communication link. The first node is configured to send a sync message to the second node, the sync message including data to enable the second node to reset a clock to the same time as a clock of the first node, wherein the data is based on timing information obtained using the plurality of attendance polls.

BRIEF DESCRIPTION OF THE DRAWINGS

By way of example, a specific embodiment of the disclosed device will now be described, with reference to the accompanying drawings, in which.

DETAILED DESCRIPTION

Figure 1:
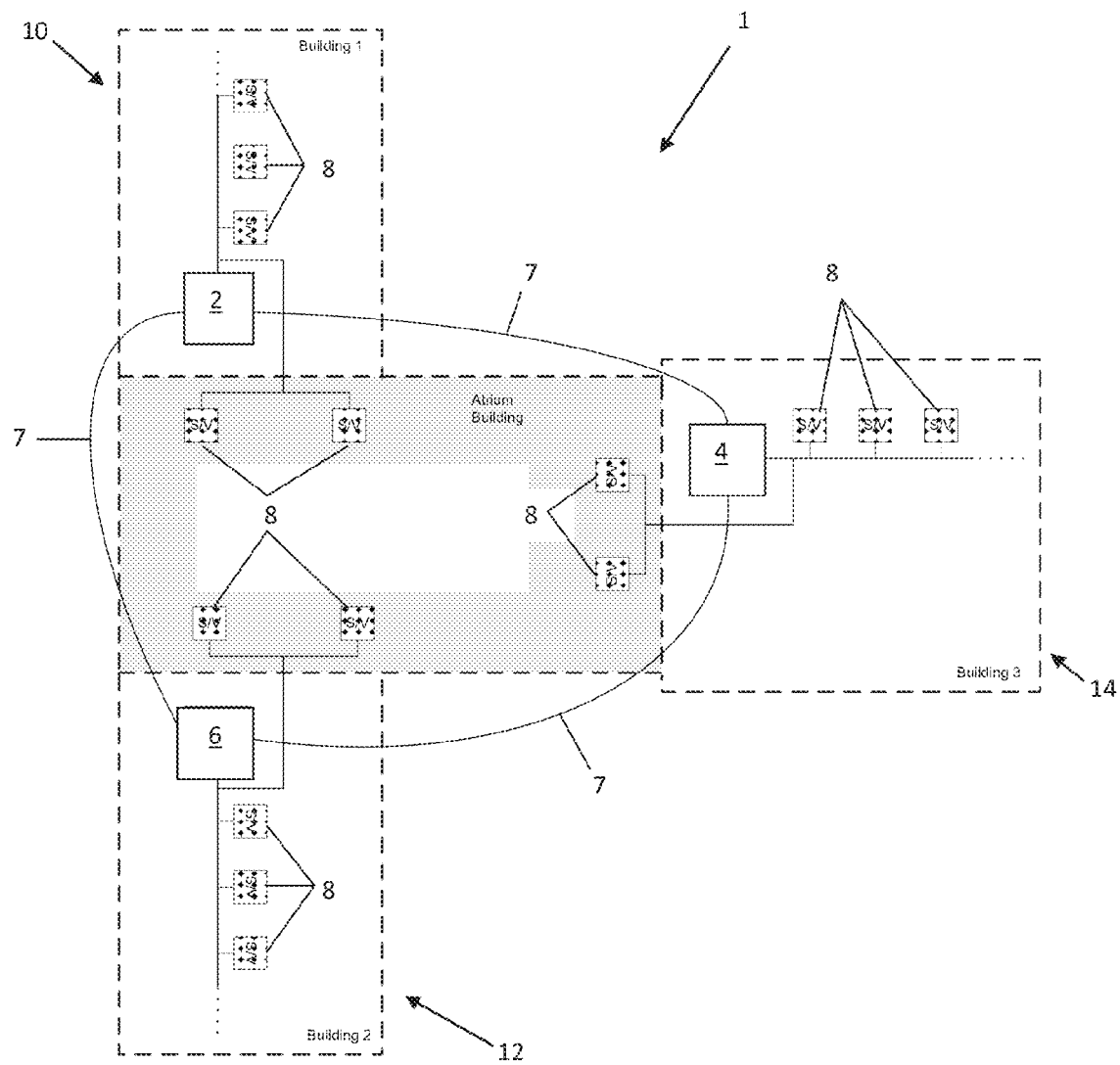
FIG. 1 is a schematic of a first embodiment of a fire alarm system network including a plurality of fire panels.

Referring to FIG. 1, a fire alarm network 1 can include a system of individual fire panels 2, 4, 6 communicating on a communications loop 7 as a peer-to-peer network. The communications scheme used by the network 1 may be based on a "token ring" communications protocol. In token ring communications, an electronic data "token" is passed from one node to the next. In the illustrated embodiment, each of the fire panels 2, 4, 6 constitutes a network "node." The node 2, 4, 6 that holds the token is the only one permitted to talk on the network 1. A node that has no messages or requests for the network simply passes the token onto the next node. Thus, every node has an equal chance of putting a message out on the network when needed.

Each of the nodes 2, 4, 6 may supervise, monitor and/or control a plurality of monitoring and notification devices 8, such as smoke detectors, audible notification devices, visual notification devices and the like. In the illustrated embodiment, each of the nodes 2, 4, 6 services an individual building 10, 12, 14 which surround an included atrium building 16. The atrium building 16 is serviced by devices 8 that are controlled by each of the nodes 2, 4, 6. As previously noted, where the devices 8 are strobe lights, it may be important to synchronize the flashing of all strobes in the atrium building 16 so that they flash in substantial unison.

Although the nodes 2, 4, 6 are part of the overall fire alarm network 1, each node maintains the status and control of its own devices 8. Each node 2, 4, 6 may pass on status information regarding the node itself or one or more of its associated devices 8 to the other nodes in the network 1. In the illustrated token ring environment, network information is sequentially transmitted from one node to another. At each node, the network message is captured and either retransmitted as received, or modified before retransmission to provide the network with a status update. The ability of the message to circulate through the network defines network status and allows the nodes to respond accordingly.

In the illustrated embodiment, the fire alarm network 1 is a token ring style network with each node set up physically in a ring, often referred to as a "style 7" token ring. It will be appreciated, however, that the actual topology of the network 1 can have a non-ring layout (referred to as "style 4" token ring.) It will also be appreciated that although the fire alarm network 1 is illustrated as having three individual nodes, this is not limiting, and the network can have greater or fewer than three.

Figure 2:
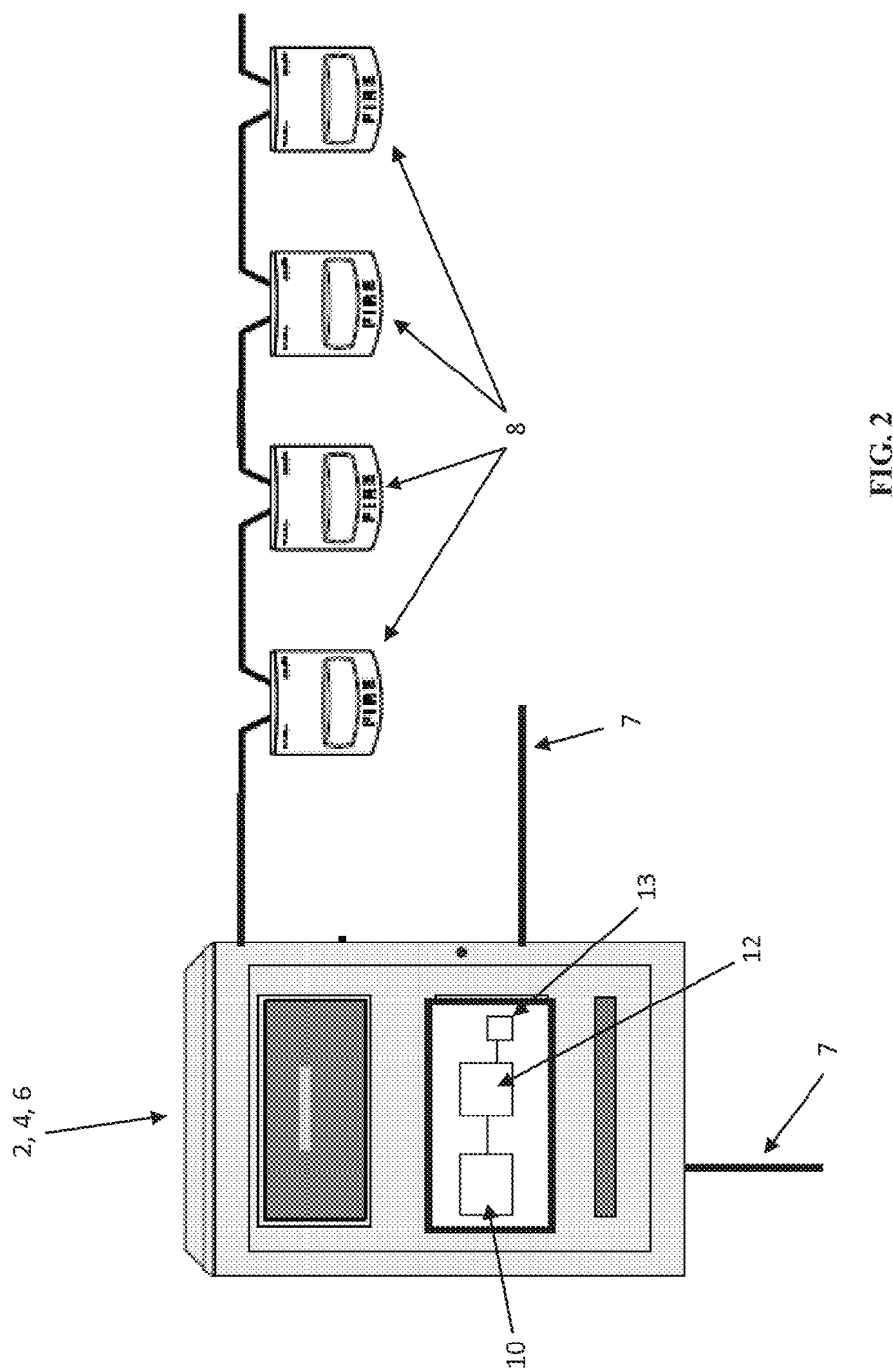
FIG. 2 is a schematic of an exemplary fire panel with a plurality of associated visual notification appliances.

Referring to FIG. 2, each node 2, 4, 6 is connected to the fire alarm network 1 via a network interface 10, which in one embodiment is a network interface card (NIC). The network interface 10 serves as the interface between the associated node 2, 4, 6 and the fire alarm network 1. The network interface 10 includes, or is associated with, a processor 12 that controls the functions of the network interface and the node 2, 4, 6. A memory 13 may be coupled to the processor 12 for storing a variety of information relating to the operation of the associated node and devices.

When the fire alarm network 1 is a token ring style network, a single node on the network will be designated as having responsibility to oversee the "health" of the network 1. This node is designated as the "monitor node." The monitor node may be automatically designated during network startup. For example, during boot up of the individual nodes, the nodes will begin to "talk" to each other to form the network 1. At first, the monitor node is designated as the node with the lowest node address (where a valid address range is, for example, 1-100). The reason the lowest address is usually the monitor at system boot-up is because the timers used to send the monitor request token are based on the node address. In an ideal arrangement in which all nodes are rebooted at the same time, node address "1" will be the monitor because it will be the first one to send out a token. In operation, the monitor can shift to whichever node happens to be able to send the first token or is the node at the farthest left (in a style 4 token ring). While operating as the monitor node, the node keeps track of the network status of each of the other nodes on the network 1. It also keeps track of and reports on the overall network topology, and monitors the network 1 for changes in the network's physical health such as wiring issues, missing nodes, and the like. To perform these functions the monitor node uses a method called attendance polling.

In one embodiment, attendance polling occurs every eight seconds. In a style 7 (i.e., loop) network, the monitor node sends out a sequence of four attendance polls. The first two attendance polls are sent out around the network 1 to the left (i.e., they are sent from the left side of the monitor node's network interface 10) and the second two polls are sent out around the network 1 to the right (i.e., they are sent from the right side of the monitor node's network interface). In each case, since the network is formed as a loop, the monitor node expects to see the attendance poll return on the side of the network interface 10 opposite to that from which it was sent out. As such, if the monitor node sends out a poll on the right side of its network interface it would expect to see that poll return on the left side. This, of course, confirms to the monitor node that a complete loop exists. As will be appreciated, the opposite occurs when the monitor node sends out the poll on the left side. This dual polling mode allows the monitor node to determine which nodes are currently connected, whether there is a complete loop, and if a complete loop is not detected it allows the monitor node to determine where the break is. If a break is discovered, the attendance polling process allows the network 1 to detect the condition and to adjust its topology accordingly. In some cases, this may include changing the node 2, 4, 6 which is designated as the monitor node.

The disclosed system and method can use this attendance polling process to synchronize devices 8 around the network 1, regardless of which node 2, 4, 6 the individual devices are associated with. This is done by identifying one of the nodes 2, 4, 6 as being a "SyncHost." In one embodiment, the SyncHost is also the monitor node. The SyncHost is in charge of the "SyncTime" around the network 1, where the SyncTime is the time to which all nodes 2, 4, 6 and associated devices 8 are periodically synced.

As with the monitor node, the SyncHost can move to a different node if and when the network topology changes. This ensures that the SyncHost is the same node as the monitor node for the network 1 (since the monitor node itself can move to a different node if and when the network topology changes). With the monitor node being responsible for the overall health of the network it can now also act as the SyncHost. To sync all nodes 2, 4, 6 (and their associated devices 8) to a single time, the SyncHost may send one or more data packets around the network 1 which can be used to instruct all the network interfaces to reset their internal clocks to a particular time (the SyncTime). Due to the nature of the token ring topology, in which the data packets are sent from node to node in serial fashion around the ring, the data packets will not reach the individual nodes at exactly the same time. Thus, simply sending a single piece of sync data to the nodes over the network 1 will not result in the clocks of each network interface being synced to a desired high degree. Rather, a compensation factor must be employed to take into consideration the transmission delays that occur as the data packets traverse the ring.

As will be discussed in greater detail later, the SyncHost can utilize data packets that are sent out around the network 1 as part of the attendance polling process to calculate travel time around the network 1. These travel time calculations can be used to determine data packet travel time to each of the individual nodes 2, 4, 6 from the SyncHost node. The individual travel time can be utilized as an offset to synchronize the clocks on all of the nodes 2, 4, 6 around the network. Thus, when a sync message is sent out by the SyncHost, each node receiving that message can apply its own compensation factor in order to determine the actual SyncTime. Once each of the individual nodes 2, 4, 6 is set to the same SyncTime, the devices 8 (i.e., strobes) associated with each node will flash substantially in sync if and when the nodes (i.e., fire panels) are in an alarm condition.

The disclosed system and method are adaptive, meaning that regardless of the network configuration (i.e., number of nodes, length of wiring between nodes, and style of network configuration) each of the nodes is independently able to calculate and apply an appropriate correction factor to the SyncTime message sent out by the SyncHost. Since the individual nodes are responsible for calculating their own correction factors, adding more nodes to the network 1 does not result in increased processing load on the SyncHost. This results in an efficient technique for constantly calculating and updating the travel time of data around the network 1.

In one embodiment, the SyncTime message is sent out every 32 seconds (i.e., immediately following four attendance polls which are sent out at eight second intervals). Every eight seconds, each of the nodes 2, 4, 6 (depending on which node is the SyncHost) receives an attendance poll and uses some or all of the poll information in calculating time offsets to determine if any changes that would affect sync have occurred in the network 1. Examples of such network changes include a break in the ring, such as can occur if a node is taken off line or if a node malfunctions.

In addition to network changes, the nodes can fall out of sync due to drift in the clocks associated with the nodes' network interfaces. This drift can be calculated using the tolerance of the crystal in conjunction with pre-scaler settings' in the software. A typical network interface drift value may be about 600 microseconds over a 32 second period. Thus, where the SyncTime message is sent out every 32 seconds (as noted above), a maximum 600 microsecond drift may be experienced. Such a degree of drift may be acceptable from a device synchronization standpoint, but greater drift may not be desirable. As such, the timing of the SyncHost message can be selected to ensure that the individual nodes do not drift more than a desired amount between successive syncs.

As previously noted, the disclosed syncing technique employs attendance polls that are periodically sent by the monitor node and that must be responded to by the other nodes of the network 1. In one embodiment, these attendance polls are sent every eight seconds in left and right directions. The monitor sends two attendance polls to the left and then two attendance polls to the right. The attendance polls are sent in opposing directions to enable the monitor node to quickly identify a break in the network 1 and to react accordingly. In addition, sending polls to the left and to the right accounts for physical asymmetry of network nodes in relation to the monitor. For example, if a network has only two nodes (one being the monitor node), the distance between the two nodes will be the same in both directions. When a third node is added, however, the asymmetry of the network is apparent. Thus, the distance traveled from the monitor node to the right sides of the other two nodes is different from the distance traveled from the monitor node to the left sides of those nodes. As such, the only way to measure both distances is to send a message (poll) left and right. In that way it is possible to sample the distance to both sides of each node, as well as the total distance of the loop.

The time synchronization technique can look for the transition from left directed to right directed messages, which enables it to solve for the total distance a message must travel between the monitor node and the individual "polled" node. Once the monitor node and the individual polled nodes have seen the left-right messages, the monitor node will send a SyncTime message which contains a "compensation time." The individual nodes 2, 4, 6 will then add their own compensation time to the SyncTime included in the message to produce the estimated real time of the monitor node. The clock associated with the node 2, 4, 6 will then be reset to this real time of the monitor node so that all clocks in the network are set to substantially the same time. This occurs about once every 32 seconds.

The SyncTime message may include the information shown in Table 1. The first two bytes of the SyncTime message include a control code, as well as the sender's node address, which tell the individual nodes which node sent the message (i.e., which node is the monitor node). Three bytes of sync time are then provided, which include the time at which the SyncTime message was sent and the result of the compensation determination made by the SyncHost. In one exemplary embodiment, SyncTime can be a 24 bit variable in which each bit constitutes a value of 625 microseconds. Each synchronized node will have its own SyncTime variable, and once fully synchronized, should be within +/−1.25 milliseconds (ms) of the monitor node's SyncTime, depending on clock drift.

Byte "5" is used by the network interface 10 of each individual node 4, 6 to figure out whether to apply network time compensation or not. This can be necessary when an event such as a break occurs which changes the physical network topology. This will affect the delay calculations, and thus, the algorithm will reset its numbers and restart the data acquisition phase. During this time, the monitor node 2 may send out a time sync message (e.g., "0xAA," 0xA5) to let the individual nodes 4, 6 know that it had to send out the time sync message but it is not yet ready to apply the compensation. As such, the time contained in the message is the uncompensated time when the monitor node 2 sends the message. The individual nodes 4, 6 are able to use this in a worst case scenario to ensure that their time will be within a few milliseconds of the monitor node's time. Usually the network 1 will resynchronize before the nodes will need to employ a "legacy sync."

Bytes 6 and 7 are CRC ("cyclic redundancy check") bytes, which are used to verify that the message has arrived correctly

TABLE 1

| SyncTime Message Network Package | |
|---|---|
| SyncTime Message Byte # | Contents |
| 0 | Control Code = 0xED |
| 1 | Sender Node's Address |
| 2 | MSB $1^{st}$ byte of SYNCTIME |
| 3 | MidSB $2^{nd}$ byte of SYNCTIME |
| 4 | LSB $3^{rd}$ byte of SYNCTIME |
| 5 | Type of Time sync |
|   | 0xA5 = New time Sync (w/ compensation) |
|   | 0xAA = Old Time Sync (w/o compensation) |
| 6 | $1^{st}$ byte of CRC |
| 7 | $2^{nd}$ byte of CRC |

Figure 3:
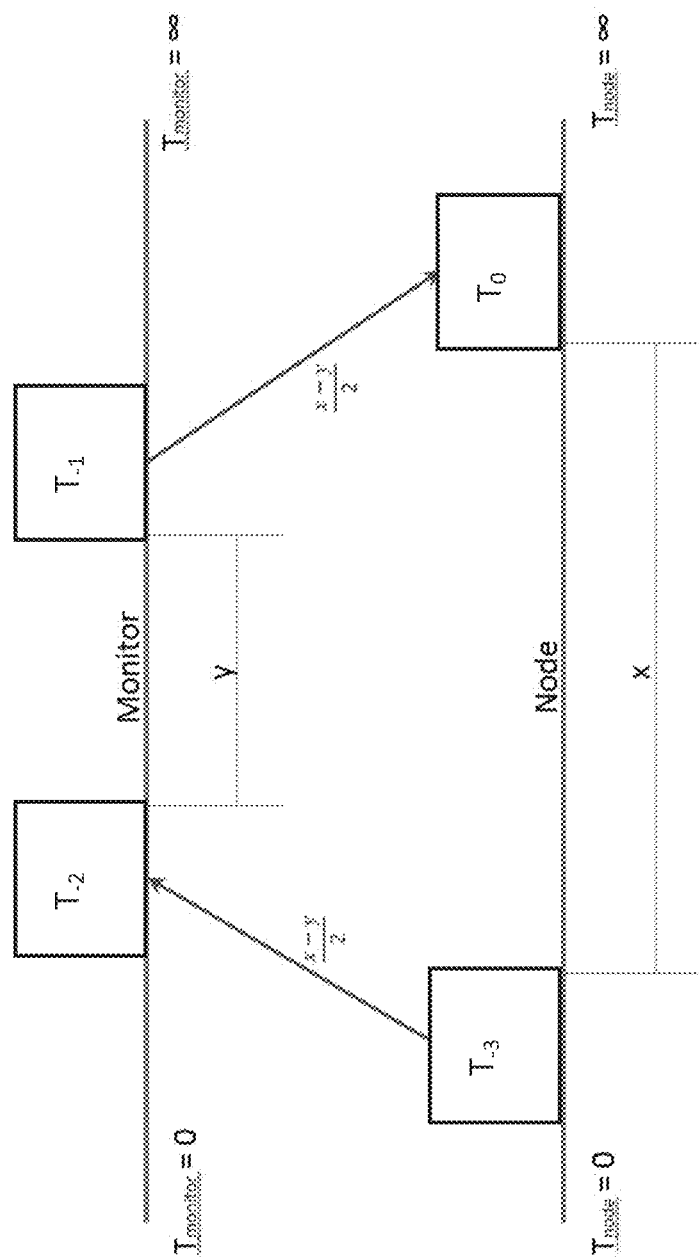
FIG. 3 is a representation of a monitor node's time, an individual node's time, and the relationship between time stamps used to determine a compensation factor for the node on the network.

Referring now to FIG. 3, a visual representation is provided of a monitor node's time, an individual node's time, and the relationship between time stamps used to determine an appropriate compensation factor for the individual node on the network 1. As will be appreciated, the time of transmissions, reception, and processing of the SyncTime message are the key to synchronizing the clocks of the individual nodes 2, 4, 6. In one embodiment, four time stamps are used to obtain the time delay between the monitor node and each individual node 2, 4, 6 (recall, however, that one of the nodes will be the "monitor node" and thus will not have any delay as it will be the node sending out the SyncTime message). The following description will proceed assuming that node 2 is the monitor node (and the SyncHost) and will describe the time stamping process in relation to node 4. It will be appreciated, however, that the same process will be used for node 6. It will also be appreciated that the system and method is not limited to three nodes, and can be used with a greater number of nodes, as desired.

As noted, four individual time stamps are used, namely $T_0$, $T_{-1}$, $T_{-2}$ and $T_{-3}$. Initially, the monitor node 2 sends a first attendance poll out around the network 1. Time stamp $T_{-3}$ represents the time at which individual node 4 sends the first attendance poll back to the monitor node 2. Note, this value will be different for each node on the network 1, as the attendance poll is transmitted serially around the ring, from node to node. The poll will, therefore, be sent "back" to the monitor node 2 at different times from different nodes. $T_{-2}$ represents the time at which the monitor node 2 receives the first attendance poll back from the individual nodes. $T_{-1}$ represents the time at which the monitor node 2 sends the second attendance poll to the individual nodes, and $T_0$ is the time when the individual node 4 receives the second attendance poll. $T_{-1}$ and $T_{-2}$ will be the same for all nodes on the network, while $T_0$ and $T_{-3}$ will be different for each node. As will be described in greater detail below, these time stamps can be used by the monitor node 2 and the individual nodes 4, 6 to calculate individual compensation times for the individual nodes 4, 6 of the network 1.

Figure 4A:
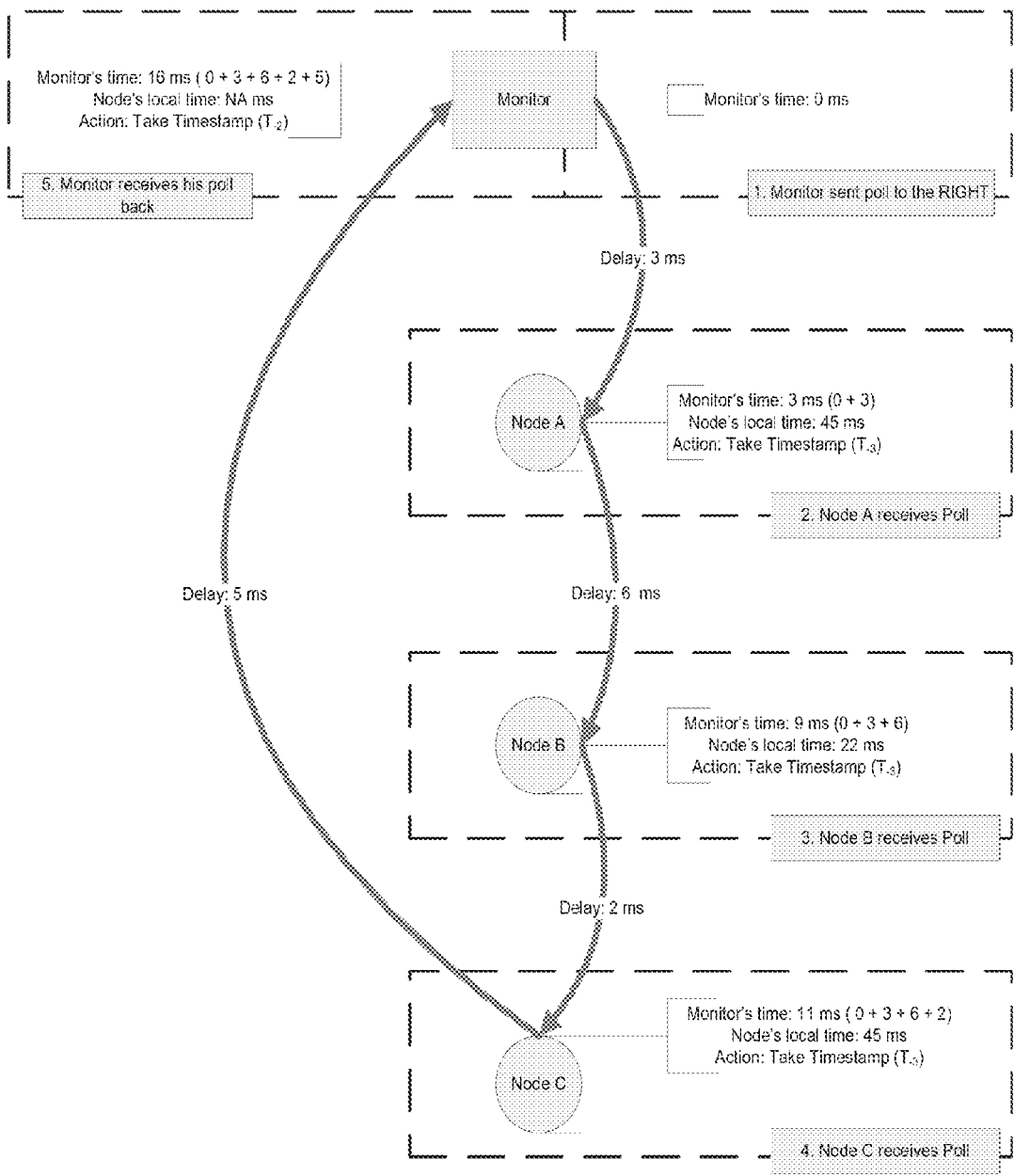
FIGS. 4A and 4B are a schematics illustrating time delays at specific nodes in an exemplary ring network using the disclosed polling method.
Figure 4B:
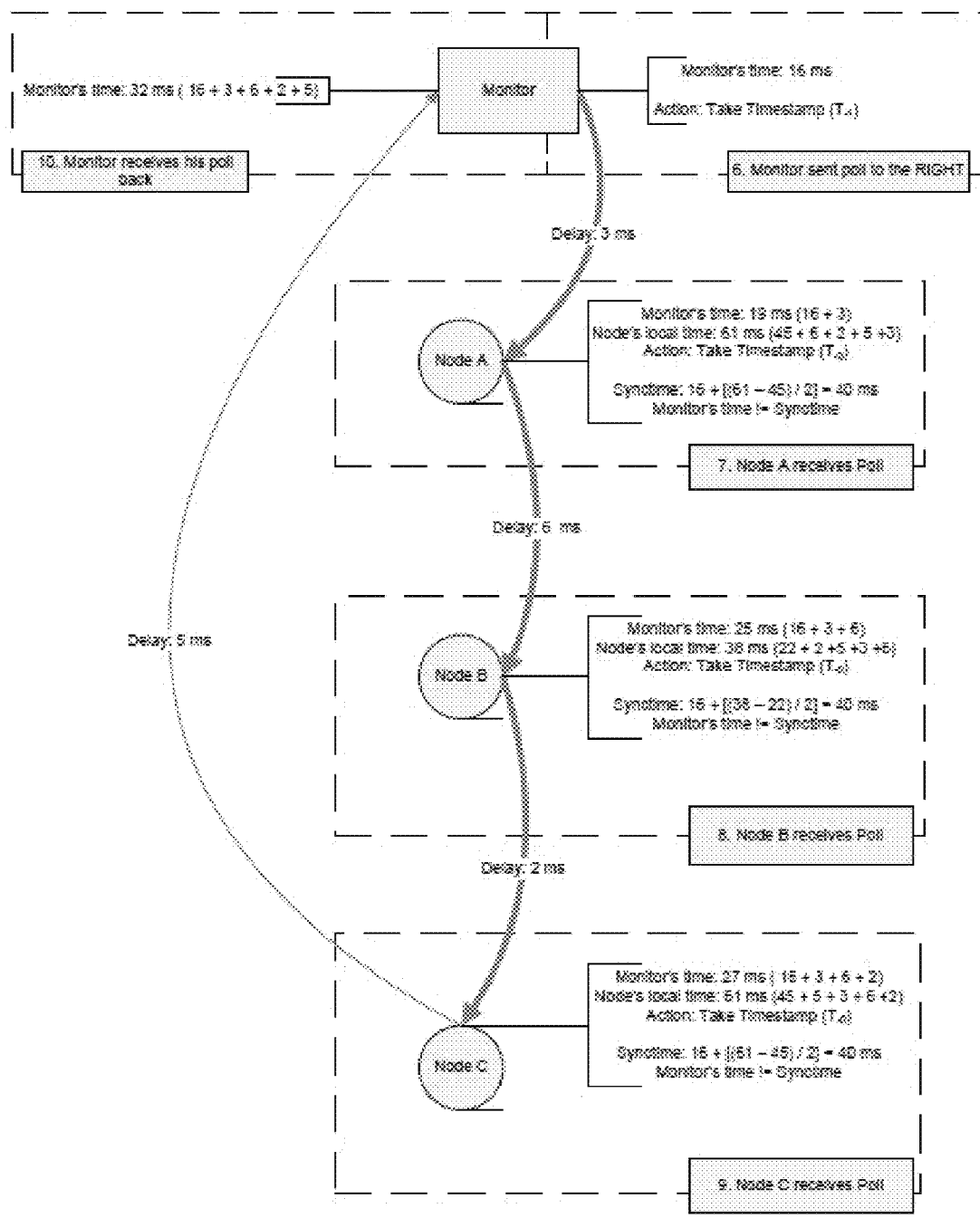

FIGS. 4A and 4B illustrate cumulative time delays during successive polls of the nodes on the network 1. FIG. 4A illustrates the path of a first attendance poll sent from the monitor node 2 to the individual nodes 4, 5, 6 of the network 1. Initially, the monitor node's time is "0" when it sends the first poll to the right on the communication link 7. When individual node 4 receives the first poll, the monitor node's time is 3 ms (representing a transmission time delay of 3 ms), the local time for individual node 4 is 45 ms. The node records timestamp T−3 and sends the first poll along to individual node 5. When individual node 5 receives the first poll, the monitor node's time is 9 ms (representing a transmission time delay of 6 ms between individual nodes 4 and 5, as well as the initial delay of 3 ms from the monitor node to individual node 4). The local time for individual node 5 is 22 ms. Node 5 records timestamp T−3 and sends the first poll along to individual node 6. When individual node 6 receives the first poll, the monitor node's time is 11 ms (representing a transmission time delay of 2 ms between individual nodes 5 and 6, as well as the delay of 9 ms from the monitor node to individual node 6). The local time for individual node 6 is 45 ms. Node 6 records timestamp T−3 and sends the first poll back to the monitor node 2. As can be seen, a time delay of 5 ms is incurred in this transmission back to the monitor node 2.

FIG. 4B illustrates the path of a second attendance poll sent from the monitor node 2 to the individual nodes 4, 5, 6 of the network 1. At the time the second attendance poll is sent, the monitor node's time is 16 ms (representing the time elapsed between sending and receiving the first attendance poll). The monitor node 2 records timestamp T−1 and sends the second attendance poll to the right on the communication link 7. When individual node 4 receives the second poll, the monitor node's time is 19 ms (representing the total transmission time delay for the first attendance poll of 16 ms, plus the transmission delay of 3 ms between the monitor node 2 and node 4), the local time for individual node 4 is 61 ms (representing the initial node time of 45 ms, plus the total loop time delay of 16 ms). The node records timestamp T0 and sends the first poll along to individual node 5. The SyncTime for individual node 4 is 24 ms (representing 16+(61 ms-45 ms)/2).

When individual node 5 receives the second poll, the monitor node's time is 25 ms (again, representing the total transmission time delay for the first attendance poll of 16 ms, plus the transmission delay of 3 ms between the monitor node 2 and node 4, and the transmission delay of 6 ms between node 4 and node 5). The local time for individual node 5 is 38 ms (representing the initial node time of 22 ms, plus the total loop time delay for the first attendance poll of 16 ms). The node records timestamp T0 and sends the first poll along to individual node 5. The SyncTime for individual node 5 is 24 ms (representing 16+(38 ms-22 ms)/2). The monitor node's time, again, is equal to the SyncTime. When individual node 6 receives the second poll, the monitor node's time is 27 ms (once again, representing the total transmission time delay for the first attendance poll of 16 ms, plus the transmission delay of 3 ms between the monitor node 2 and node 4, the transmission delay of 6 ms between node 4 and node 5, and a transmission delay of 2 ms between nodes 5 and 6). The local time for individual node 6 is 61 ms (representing the initial node time of 45 ms, plus the total loop time delay for the first attendance poll of 16 ms). The node records timestamp T0 and sends the first poll back to the monitor node 2. The SyncTime for individual node 6 is 24 ms (representing 16+(61 ms-45 ms)/2). When the monitor node 2 receives the second attendance poll back from individual node 6, the monitor node's time is 32 ms, representing the total time delay around the loop for two attendance polls.

"Style 7" Token Ring Network Operation

Tables 2-4 below show the individual steps that the monitor node 2 and each individual node will follow in order to synchronize the nodes 2, 4, 6 of the network 1. As shown, the monitor node 2 sends a first attendance poll out of the left side of the network interface 10. The individual node 4 receives the first attendance poll and sends it leftward around the communications loop 7 back to the monitor node 2. The monitor node 2 sends a second attendance poll out of the left side of the network interface 10. The individual node 4 receives the second attendance poll and sends it leftward around the communications loop 7 back to the monitor node 2. The individual node 4 records time stamp $T_{-3}$ when it sends the second attendance poll back to the monitor node 2. The monitor node 2 records time stamp $T_{-2}$ when it receives the second attendance poll back from the individual node 4. The monitor node 2 sends a third attendance poll out of the right side of the network interface 10, and records time stamp $T_{-1}$. The individual node 4 receives the third attendance poll and sends it rightward around the communications loop 7 back to the monitor node 2. The individual note 4 records time stamp $T_0$ when it sends the third attendance poll back to the monitor node 2. The monitor node 2 sends a fourth attendance poll out of the right side of the network interface 10, which the individual node 4 receives and sends rightward around the communications loop 7 to the monitor node 2. The monitor node 2 then sends the SyncTime message to the individual node 4.

As shown in Table 3, prior to sending out the SyncTime message, the monitor node 2 calculates the time difference between time stamps $T_{-1}$ and $T_{-2}$, subtracts that value from the "current time" and stores the resulting value in the Sync-Time message. The SyncTime message is then sent to the individual node 4. In one embodiment, an additional time increment may be subtracted from the "current time" prior to storing the "current time" in the message and sending it to the individual nodes. This additional time increment may compensate for internal processing time of the monitor node 2 (e.g., internal message transmission and buffering time). In one embodiment, this additional time increment may be about 2 milliseconds.

As shown in Table 4, once the individual node 4 receives the SyncTime message, the individual node 4 calculates the time difference between time stamps $T_0$ and $T_{-3}$, and adds the difference to the "current time" in the SyncTime message to obtain a corrected time. The network interface 10 of the individual node 4 then overwrites the individual sync time of the node's clock with this corrected time.

TABLE 2

Network Perspective - Style 7

| Monitor Node | Individual Node |
|---|---|
| Send First Att Poll (Left) | Forward First Att Poll (L) |
| Send Second Att Poll (Left) - Record Time $T_{-2}$ upon Receive | Forward Second Att Poll (L) - Record Time $T_{-3}$ |
| Send Third Att Poll (Right) - Record Time $T_{-1}$ | Forward Third Att Poll (R) - Record Time $T_0$ |
| Send Fourth Att Poll (Right) | Forward Fourth Att Poll (R) |
| Send Time Sync Message | Receive Time Sync Message |

TABLE 3

Monitor's Perspective - Style 7

| Monitor Node | Action |
|---|---|
| Idle | |
| Send First Att Poll (Left) | |
| Send Second Att Poll (Left) | Record Time $T_{-2}$ upon receiving the same poll after traveling the entire network once. |
| Send Third Att Poll (Right) | Record Time $T_{-1}$ |
| Send Att Poll (Right) | |
| Send out Time Sync message | Steps prior to sending out the TSM Calculate time difference between $T_1$ and $T_{-2}$. Subtract difference from current time and store into message Send the message Add ~2 ms from current time (to compensate for message transmission and buffer time) |

TABLE 4

Node's Perspective - Style 7

| Individual Node | Action |
|---|---|
| Receive Attendance Poll (L) | |
| Receive Attendance Poll (L) | Record time ($T_{-3}$) when forwarding |
| Receive Attendance Poll (R) | Record time ($T_0$) when forwarding |
| Receive Attendance Poll (R) | |
| Receive Time Sync Message | Start calculating what the time is Calculate time difference between $T_0$ and $T_{-3}$. Get time from message Add difference from the message's time Overwrite SyncTime with this time |

Figure 5:
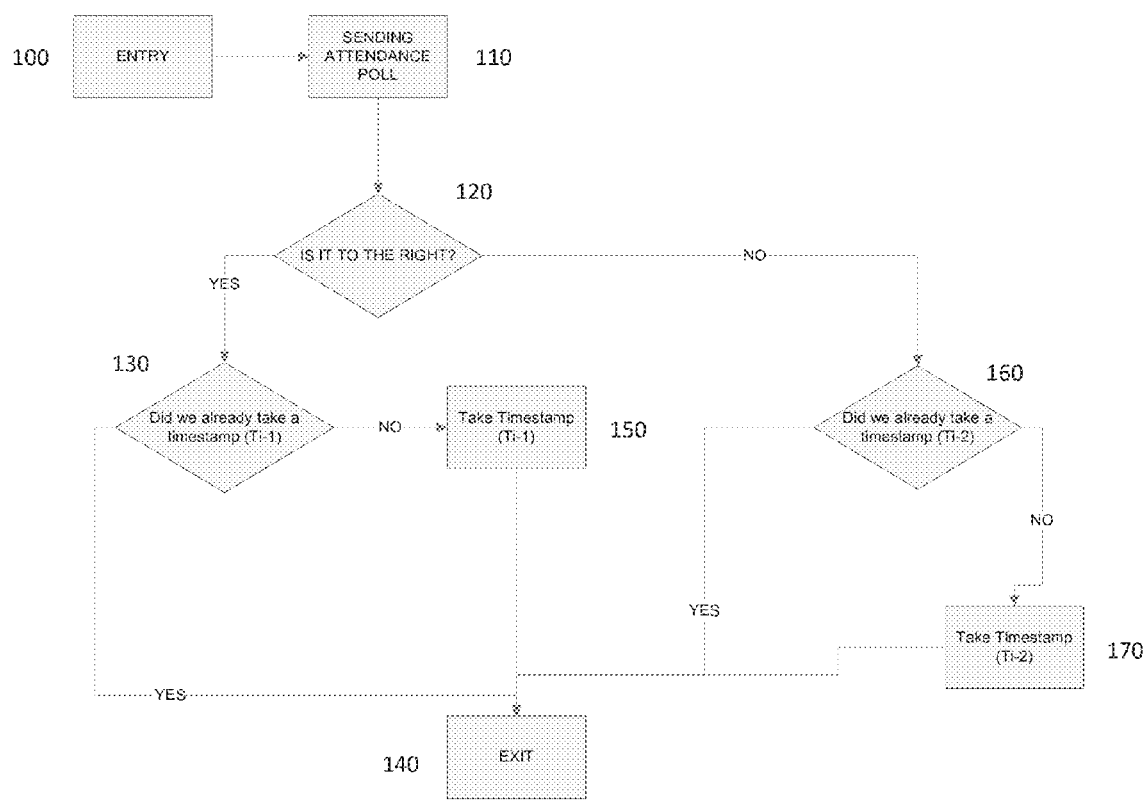
FIG. 5 is a flow chart illustrating the actions of an exemplary monitor node in accordance with a first embodiment of the disclosed method.

The time stamping process from the monitor nodes "perspective" in a Style 7 token ring is illustrated in FIG. 5. At step 100 the process begins. At step 110, the monitor node sends an attendance poll. At step 120 a determination is made as to whether the poll is to the right or left. If it is to the right, then at step 130, a determination is made as to whether a timestamp has already been taken. If the answer is yes, then the process ends at step 140. If, however, the answer is no, then at step 150 a timestamp ($T_{-1}$) is taken, whereafter the process ends at step 140. If, at step 120 the poll is determined to have been to the left, then at step 160 a determination is made as to whether a timestamp has already been taken. If the answer is yes (i.e., $T_{-1}$), then the process ends at step 140. If the answer is no, then at step 170 timestamp ($T_{-2}$) is taken, whereafter the process ends at step 140.

Figure 6:
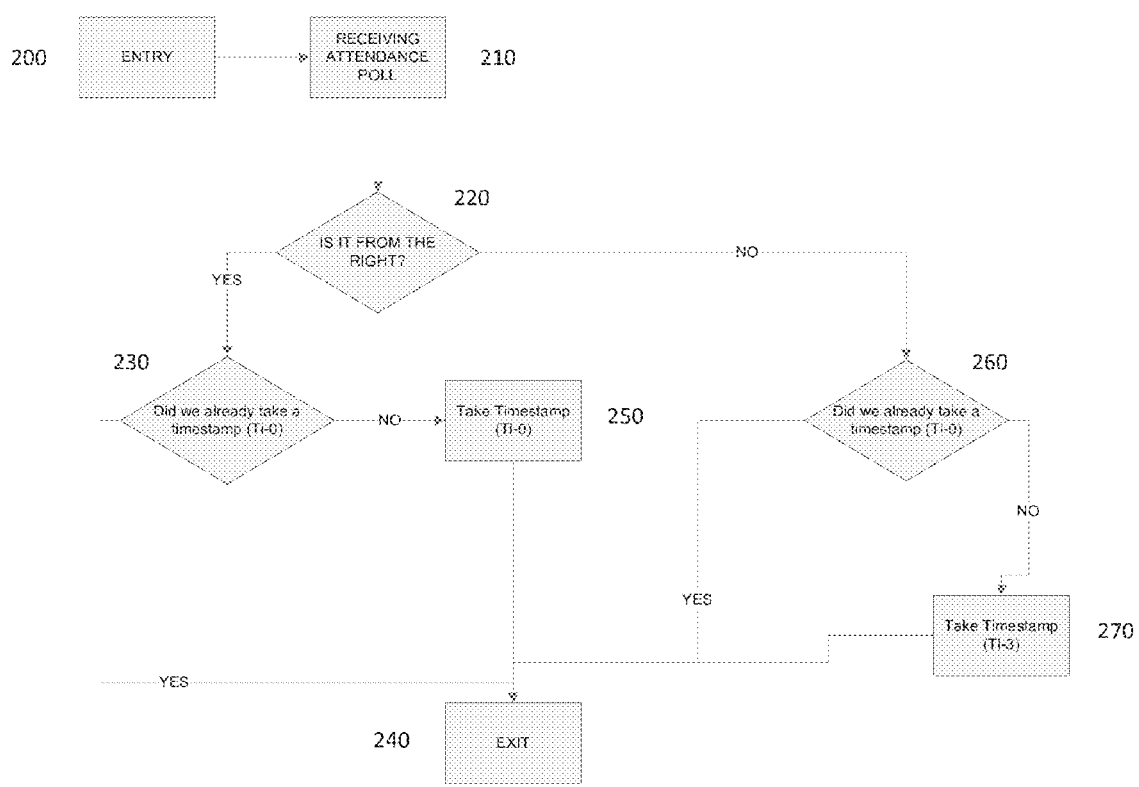
FIG. 6 is a flow chart illustrating the actions of an exemplary individual node in accordance with a first embodiment of the disclosed method.

This time stamping process from the individual node's perspective in the Style 7 token ring is illustrated in FIG. 6. At step 200 the process begins. At step 210, the individual node receives an attendance poll from the monitor node. At step 220 a determination is made as to whether the poll from the right or left. If it is from the right, then at step 230, a determination is made as to whether a timestamp has already been taken. If the answer is yes, then the process ends at step 240. If, however, the answer is no, then at step 250 a timestamp ($T_0$) is taken, whereafter the process ends at step 240. If, at step 220 the poll is determined to have been from the left, then at step 260 a determination is made as to whether a timestamp (i.e., $T_0$) has already been taken. If the answer is yes, then the process ends at step 240. If the answer is no, then at step 270 a timestamp ($T_{-3}$) is taken, whereafter the process ends at step 140.

"Style 4" Token Ring Network Operation.

Figure 7:
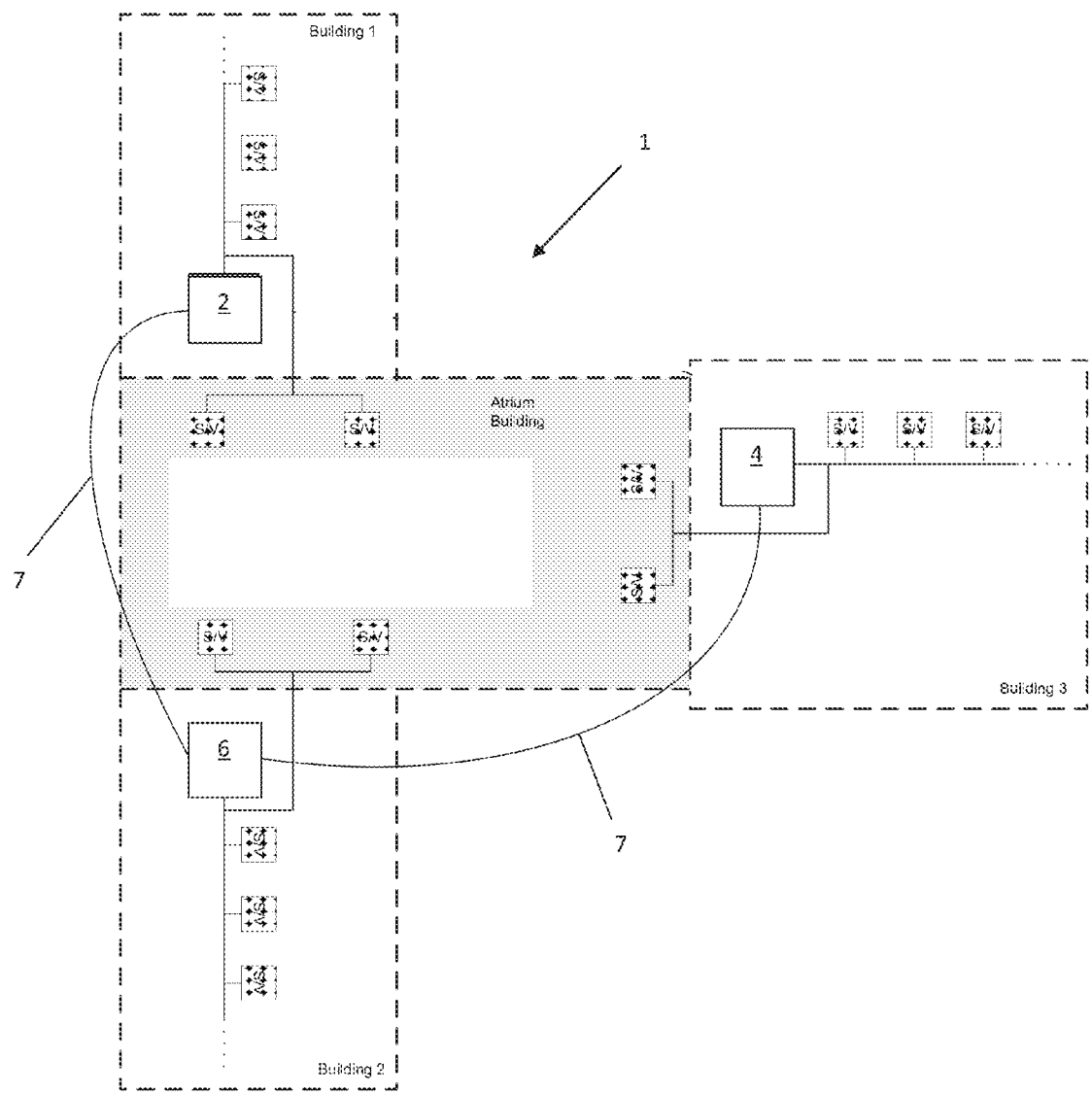
FIG. 7 is a schematic of a second embodiment of a fire alarm system network including a plurality of fire panels.

As previously noted, the disclosed system and method can be used with a fire alarm network arranged in a non-ring geometry. FIG. 7 shows such a non-ring (i.e., Style 4) token ring in which node 6 is not directly connected to node 2. This arrangement can be implemented by design, or it may form naturally upon the breakage of one of the links in a Style 7 token ring.

Tables 5-7 below show the steps that the monitor node 2 and the individual node 4 will follow. As with the "style 7" description, the current description will proceed in relation to individual node 4, and assuming that node 2 has been designated as the monitor node. Thus arranged, the monitor node 2 sends a first attendance poll out of the right side of the network interface 10. The individual node 4 receives the first attendance poll and sends it back to the monitor node 2. The monitor node 2 sends a second attendance poll out of the right side of the network interface 10, and records time stamp $T_{-2}$. The individual node 4 receives the second attendance poll, sends it back to the monitor node 2, and records time stamp $T_{-3}$. The monitor node 2 sends a third attendance poll out of the right side of the network interface 10, and records time stamp $T_{-1}$. The individual node 4 receives the third attendance poll, sends it back to the monitor node 2, and records time stamp $T_0$ (if $T_{-3}$ has already been recorded). The monitor node 2 sends a fourth attention poll out of the right side of the network interface 10, which the individual node 4 receives and sends back to the monitor node 2. The monitor node 2 then sends the SyncTime message to the individual node 4, which applies a calculated compensation and resets its clock accordingly, syncing the node 4.

As shown in Table 6, prior to sending out the SyncTime message, the monitor node 2 calculates the time difference between time stamps $T_{-1}$ and $T_{-2}$, subtracts that value from the "current time" and stores the resulting value in the SyncTime message. The SyncTime message is then sent to the individual node 4. In one embodiment, an additional time increment may be subtracted from the "current time" prior to storing the "current time" in the message and sending it to the individual nodes. This additional time increment may compensate for internal processing time of the monitor node 2 (e.g., internal message transmission and buffering time). In one embodiment, this additional time increment may be about 2 milliseconds.

As shown in Table 7, once the individual node 4 receives the SyncTime message, the individual node 4 calculates the time difference between time stamps $T_0$ and $T_{-3}$, and adds the difference to the "current time" in the SyncTime message to obtain a corrected time. The network interface 10 of the individual node 4 then overwrites the individual sync time of the node's clock with this corrected time.

TABLE 5

Network Perspective - Style 4

| Monitor Node | Individual Node |
|---|---|
| Send First Att Poll (R) | |
| Send Second Att Poll (R) (Record Time - $T_{-2}$) | Record Time - $T_{-3}$ when forwarding $ATT_R$ |
| Send out Attendance poll to the RIGHT (Record Time - $T_{-1}$) | Record Time - $T_0$ when forwarding $ATT_R$ (if $T_{-3}$ was already recorded) |
| Send out Attendance poll to the RIGHT | |
| Send out Time Sync message | Apply compensation |

TABLE 6

Monitor Node's Perspective - Style 4

| Monitor Node | Action |
|---|---|
| Idle | |
| Send Att Poll (R) | Record Time - $T_{-2}$ |
| Send Att Poll (R) | Record Time - $T_{-1}$ |
| Send Att Poll (R) | |
| Send Att Poll (R) | |
| Send out Time Sync Message | Calculate time difference between $T_{-1}$ and $T_{-2}$. Subtract difference from current time and store into message Send the message |

TABLE 7

Individual Node's Perspective - Style 4

| Individual Node | Action |
|---|---|
| Idle | |
| Send Att Poll (R) | Record Time - $T_{-3}$ |
| Send Att Poll (R) | Record Time - $T_0$ |
| Send Att Poll (R) | |
| Send Att Poll (R) | |
| Send out Time Sync message | Calculate time difference between $T_0$ and $T_{-3}$. Get time from message Add difference from the message's time Overwrite SyncTime with this time |

Figure 8:
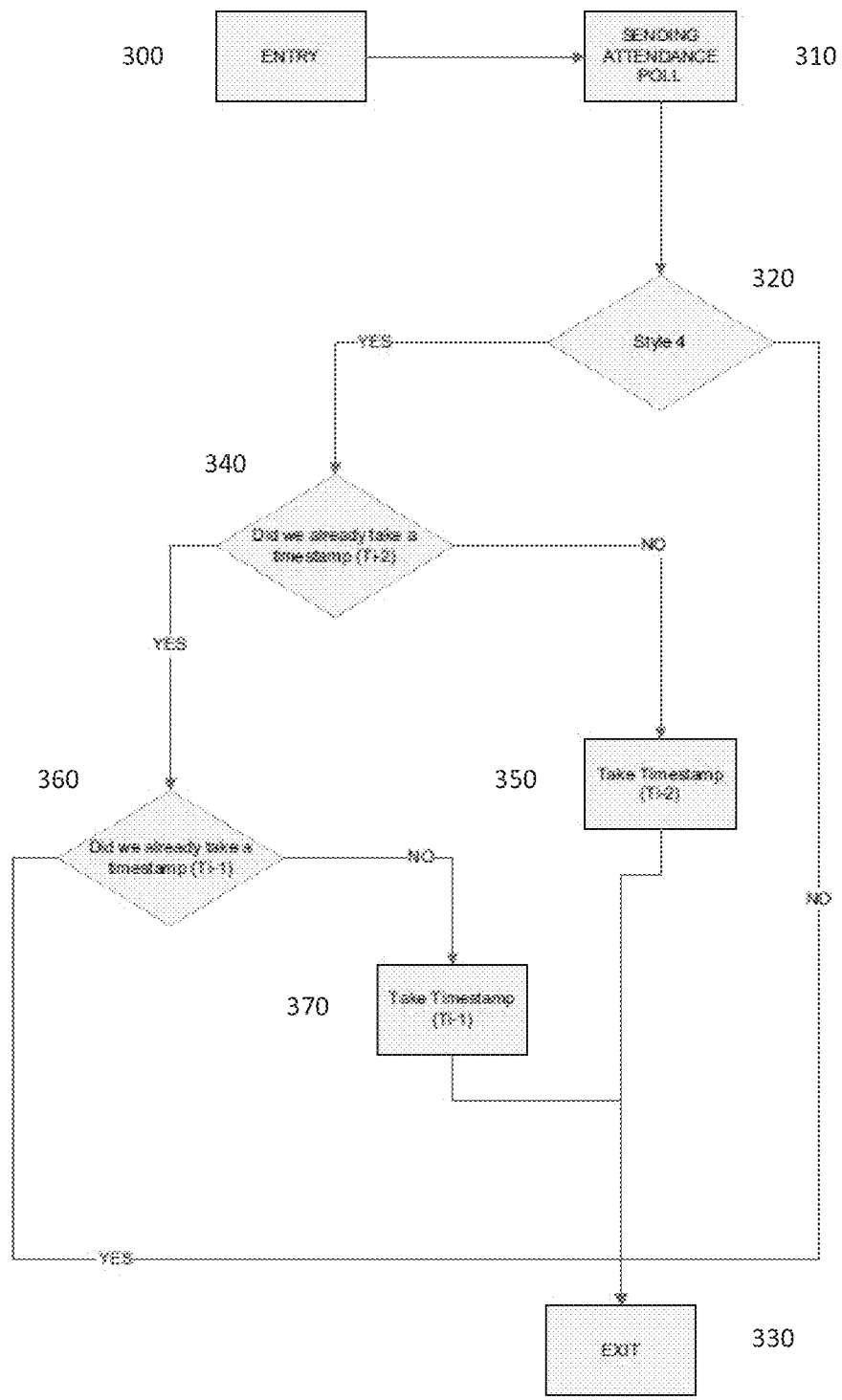
FIG. 8 is a flow chart illustrating the actions of an exemplary monitor node in accordance with a second embodiment of the disclosed method.

The time stamping process from the monitor nodes "perspective" in a Style 4 token ring is illustrated in FIG. 8. At step 300 the process begins. At step 310, the monitor node sends an attendance poll. At step 320 a determination is made as to whether the network 1 is a style 4 token ring. If the network is not a style 4 token ring, then the process ends at step 330.

If, at step 320, the network is determined to be a style 4 token ring, then at step 340 a determination is made as to whether a timestamp ($T_{-2}$) has already been taken. If no such timestamp has already been taken, then at step 350 timestamp ($T_{-2}$) is taken. The process then ends at step 330. If, however, a timestamp ($T_{-2}$) has already been taken, then at step 360 a determination is made as to whether a timestamp ($Ti_{-1}$) has already been taken. If no such timestamp ($Ti_{-1}$) has already been taken, then at step 370 timestamp ($T_{-1}$) is taken. The process then ends at step 330.

Figure 9:
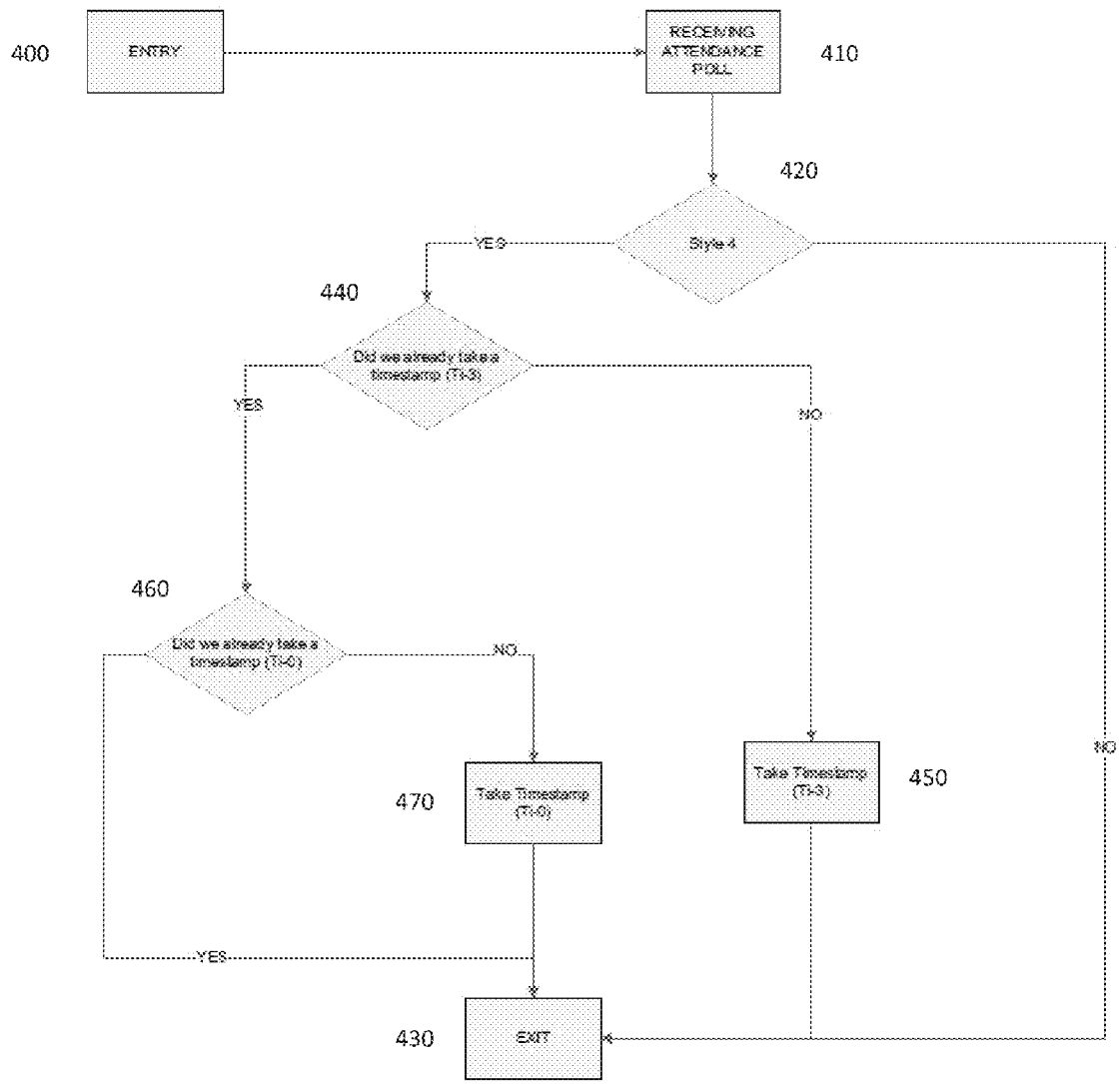
FIG. 9 is a flow chart illustrating the actions of an exemplary individual node in accordance with a second embodiment of the disclosed method.

This time stamping process from the individual node's perspective in the Style 4 token ring is illustrated in FIG. 9. At step 400 the process begins. At step 410, the individual node receives an attendance poll from the monitor node. At step 420 a determination is made as to whether the network 1 is a style 4 token ring. If the network is not a style 4 token ring, then the process ends at step 430. If, however, the network is determined to be a style 4 token ring, then at step 440 a determination is made as to whether a timestamp ($T_3$) has already been taken. If the answer is no, then at step 450 timestamp ($T_3$) is taken, whereafter the process ends at step 430. If, however, it is determined that timestamp ($T_3$) has already been taken, then at step 460 a determination is made as to whether a timestamp ($T_{-0}$) has been taken. If the answer is no, then at step 470 timestamp ($T_{-0}$) is taken, whereafter the process ends at step 430. If, however, however, it is determined that timestamp ($T_{-0}$) has already been taken, the process ends at step 430.

As previously noted, it is desirable to have all network interface clocks set to the "real time" of the monitor node 2, which can be designated as $t_{real}$. In one embodiment, $t_{msg}$ is designated as the preadjusted time sent out by the monitor node 2 in the SycTime message. $t_{node}$ is designated as the time that an individual node 4, 6 will replace its SyncTime with. Thus, each node 4, 6 uses a particular value of $t_{node}$ to convert $t_{msg}$ to $t_{real}$.

The individual nodes 4, 6 each calculate $$\frac{T0 - T3}{2} = x$$

The monitor node 2 calculates:

$$\frac{T1 - T2}{2} = y$$

and subtracts it from its current SyncTime ($t_{real}$) to get $t_{msg}$:

$$t_{msg} = t_{real} - y$$

The monitor node 2 inserts this adjusted time ($t_{msg}$) into the SyncTime message and then sends the SyncTime message to the nodes 4, 6. The individual nodes 4, 6 must determine the amount of time it takes to receive a message on the network (z) and then use that value to its new SyncTime $$(t_{node} = t_{msg} + x)$$

$$z = x - y$$

$$t_{node} = t_{real} + z \rightarrow t_{node} = (t_{real} - y) + x$$

$$t_{msg} = t_{real} - y$$

Therefore, $t_{node} = t_{msg} + x$

The individual node 4, 6 then updates its SyncTime as the value of $t_{node}$.

Figure 10:
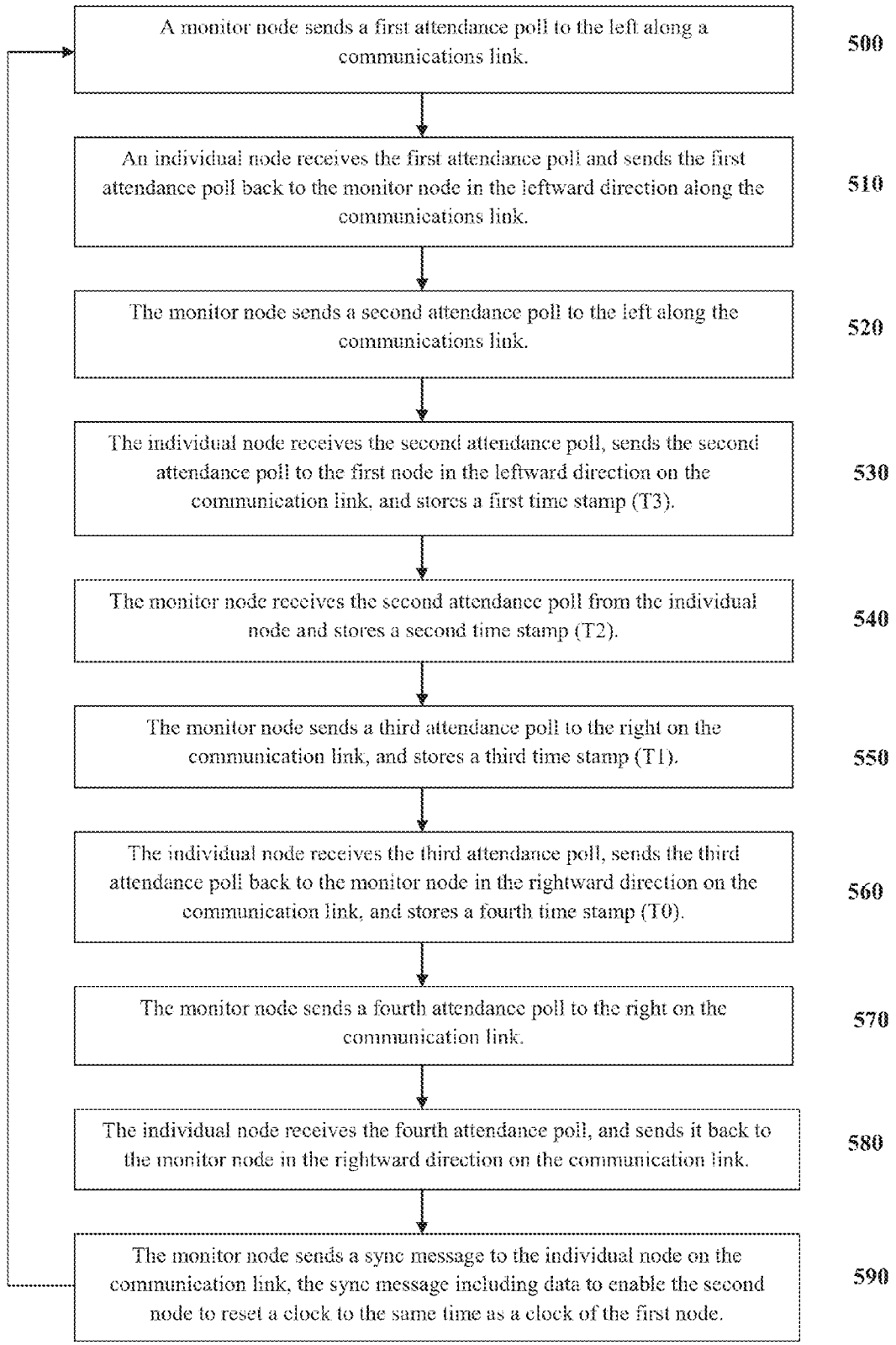
FIG. 10 is a flow chart illustrating an exemplary method of operating the system of FIG. 1.

Referring now to FIG. 10, an exemplary method of operating the system of FIG. 1 will be described. At step 500, the monitor node 2 sends a first attendance poll to the left along communications link 7. At step 510, the individual node 4 receives the first attendance poll, and sends the first attendance poll back to the monitor node 2 in the leftward direction along the communications link 7. At step 520, the monitor node 2 sends a second attendance poll to the left along communications link 7. At step 530, the individual node receives the second attendance poll, sends the second attendance poll to the first node in the leftward direction on the communication link 7, and stores a first time stamp ($T_{-3}$). At step 540, the monitor node receives the second attendance poll from the individual node 4 and stores a second time stamp ($T_{-2}$). At step 550, the monitor node sends a third attendance poll to the right on the communication link 7, and stores a third time stamp ($T_{-1}$). At step 560, the individual node 4 receives the third attendance poll, sends the third attendance poll back to the monitor node 2 in the rightward direction on the communication link 7, and stores a fourth time stamp ($T_0$). At step 570, the monitor node sends a fourth attendance poll to the right on the communication link. At step 580, the individual node receives the fourth attendance poll, and sends it back to the monitor node in the rightward direction on the communication link. At step 590, the monitor node sends a sync message to the individual node on the communication link, the sync message including data to enable the second node to reset a clock to the same time as a clock of the first node. The process may return to step 500 periodically, as desired, to maintain a desired synchronization between the clock of the monitor node 2 and the clocks of the individual nodes 4, 6.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. The term computer is not limited to just those integrated circuits referred to in the art as computers, but broadly refers to, microprocessors, microcontrollers, microcomputers, programmable logic controllers, application specific integrated circuits, and other programmable circuits, and these terms are used interchangeably herein.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto

The invention claimed is:

1. A method for synchronizing nodes on a network, comprising:
    sending, from a first node, a first attendance poll in a first direction on a communication link;
    receiving, at a second node, the first attendance poll and sending the first attendance poll to the first node in the first direction on the communication link;
    sending, from the first node, a second attendance poll in the first direction on the communication link;
    receiving, at the second node, the second attendance poll;
    sending, from the second node, the second attendance poll to the first node in the first direction on the communication link, and storing a first time stamp ($T_{-3}$);
    receiving, at the first node, the second attendance poll from the second node, and storing a second time stamp ($T_{-2}$);
    sending, from the first node, a third attendance poll in a second direction on the communication link, and storing a third time stamp ($T_{-1}$);
    receiving, at the second node, the third attendance poll from the first node; and
    sending, from the second node, the third attendance poll to the first node in the second direction on the communication link, and storing a fourth time stamp ($T_0$);
    sending, from the first node, a sync message to the second node, the sync message including sync message data to enable the second node to reset a clock to the same time as a clock of the first node, wherein the sync message data is based on timing information obtained using the first, second, and third attendance polls and on an internal processing time of the first node; and
    wherein the sync message data includes a sync time, and wherein prior sending the sync message to the second node, the sync time is determined by obtaining a difference between $T_{-1}$ and $T_{-2}$ and subtracting the difference and the internal processing time of the first node from a current time of the clock of the first node.

2. The method of claim 1, further comprising receiving, at the second node, the sync message and resetting the clock at the second node to the sync time.

3. The method of claim 2, wherein, prior to the step of resetting the clock at the second node to the sync time, the sync time is adjusted by:
    obtaining a difference between $T_0$ and $T_{-3}$; and
    adding the difference to the sync time.

4. The method of claim 1, wherein the first network node is a monitor node, and the first and second nodes have a plurality of visual notification device associated therewith.

5. The method of claim 1, wherein the first and second nodes are first and second fire panels communicating on the communication link as a peer-to-peer network based on a token ring communication protocol.

6. The method of claim 1, wherein, prior to the step of sending the sync message to the second node, the first node sends a fourth attendance poll to the second node in the second direction on the communication link, the second node receives the fourth attendance poll and sends the fourth attendance poll to the first node in the second direction on the communication link.

7. The method of claim 6, wherein first node and second node include first and second network interface cards, respectively, and wherein the first and second attendance polls are sent from a right side of the first network interface card, and the third and fourth attendance polls are sent from a left side of the first network interface card.

8. The method of claim 7, wherein the clock of the first node is associated with the first network interface card, and the clock of the second node is associated with the second network interface card.

9. A system for synchronizing nodes on a network, comprising:
a first node for sending first, second, third and fourth attendance polls, wherein the first node is configured to send the first and second attendance polls in a first direction on the communication link, and to send the third and fourth attendance polls in a second direction on the communication link;
a second node configured to receive the second attendance poll, to store a first time stamp ($T_{-3}$), and to send the second attendance poll back to the first node;
wherein the first node is configured to receive the second attendance poll from the second node, and to store a second time stamp ($T_{-2}$);
wherein the first node is configured to store a third time stamp ($T_{-1}$) when sending the third attendance poll on the communication link;
wherein the second node is configured to receive the third attendance poll, to store a fourth time stamp ($T_0$) and to send the third attendance poll back to the first node;
wherein the sync message data is based, in part, on a relationship between the first and fourth time stamps ($T_{-3}$, $T_0$);
wherein the first node is configured to send a sync message to the second node, the sync message including sync message data to enable the second node to reset a clock to the same time as a clock of the first node, wherein the sync message data is based on timing information obtained using the first, second, third, and fourth attendance polls and on an internal processing time of the first node; and
wherein the sync message data includes a sync time, and wherein prior sending the sync message to the second node, the sync time is determined by obtaining a difference between $T_{-1}$ and $T_{-2}$ and subtracting the difference and the internal processing time of the first node from a current time of the clock of the first node.

10. The system of claim 9, further comprising receiving, at the second node, the sync message and resetting the clock at the second node to the sync time.

11. The system of claim 10, wherein, prior to the step of resetting the clock at the second node to the sync time, the sync time is adjusted by:
obtaining a difference between $T_0$ and $T_{-3}$; and
adding the difference to the sync time.

12. The system of claim 9, wherein the first network node is a monitor node, and the first and second nodes have a plurality of visual notification device associated therewith.

13. The system of claim 9, wherein the first and second nodes are first and second fire panels communicating on the communication link as a peer-to-peer network based on a token ring communication protocol.

14. The system of claim 9, wherein, prior to the step of sending the sync message to the second node, the first node sends the fourth attendance poll to the second node in the second direction on the communication link, the second node receives the fourth attendance poll and sends the fourth attendance poll to the first node in the second direction on the communication link.

15. The system of claim 9, wherein first node and second node include first and second network interface cards, respectively, and wherein the first and second attendance polls are sent from a right side of the first network interface card, and the third and fourth attendance polls are sent from a left side of the first network interface card.

16. The system of claim 9, wherein the clock of the first node is associated with the first network interface card, and the clock of the second node is associated with the second network interface card.

* * * * *